United States Patent [19]

Woolley et al.

[11] Patent Number: 4,574,632

[45] Date of Patent: Mar. 11, 1986

[54] METHOD FOR GENERATING HIGH FREQUENCY HIGH LEVEL NOISE FIELDS USING LOW FREQUENCY EXCITATION OF AEROACOUSTIC NOISE

[75] Inventors: John H. Woolley, Ottawa; Robert Westley, Kanata; Carl P. Swail, Ottawa, all of Canada

[73] Assignee: Canadian Patents and Development Limited-Societe Canadienne des Brevets et d'Exploitation Limitee, Ontario, Canada

[21] Appl. No.: 660,425

[22] Filed: Oct. 10, 1984

[30] Foreign Application Priority Data

Oct. 28, 1983 [CA] Canada ..................................... 439980

[51] Int. Cl.[4] ............................................ G01N 29/00

[52] U.S. Cl. ...................................... 73/571; 331/155; 116/137 R

[58] Field of Search .................... 73/571; 331/78, 155; 181/159, 160, 182; 116/137 R

[56] References Cited

U.S. PATENT DOCUMENTS

| | | | |
|---|---|---|---|
| 1,696,304 | 12/1928 | Hutchison | 181/182 |
| 1,784,596 | 12/1930 | Hutchison | 181/182 |
| 2,424,357 | 7/1947 | Horsley | 116/137 |
| 2,424,375 | 7/1947 | Allen | 116/137 |
| 2,458,043 | 1/1949 | Zenner | 179/108 |
| 2,532,229 | 11/1950 | Horsley | 116/137 |
| 2,975,751 | 3/1961 | Bodine | 116/137 |
| 3,124,099 | 3/1964 | Skilling | 116/137 |
| 3,131,671 | 5/1964 | Fetter | 116/137 |
| 3,169,507 | 2/1965 | Rich | 116/137 |
| 3,302,301 | 2/1967 | Goble | 34/99 |
| 3,376,847 | 4/1968 | Cheeseman | 116/137 |
| 3,598,081 | 8/1971 | Houten | 116/137 |
| 3,701,334 | 10/1972 | Teitelbaum | 116/137 |
| 4,181,193 | 1/1980 | Issac et al. | 181/159 |

FOREIGN PATENT DOCUMENTS 794483 1/1981 U.S.S.R. ................................ 73/571

OTHER PUBLICATIONS

Air Force Paper TR-79-089025.

Collinear Interaction of Noise with a Finite-Amplitude Tone, Webster and Blackstock, pp. 687-693.

Facility, Martlew, pp. 1-9.

Aluminum-Iron Magnetostrictive Transducers, Boucher, pp. 573-583.

Acustica, S. Hirzel Verlag, Stuttgart, vol. 45, 1980, by E. Brocher and G. Pinna, pp. 181-189.

Design Characteristics of Gas-Jet Generators, Borisov, 1979, pp. 21-25.

Siren Programing with AM-FM, H. E. Plumblee, pp. 497-511.

*Primary Examiner*—Howard A. Birmiel

*Attorney, Agent, or Firm*—Wenderoth, Lind & Ponack

[57] ABSTRACT

There is described a system for producing noise particularly for sonic testing of an article, such as a satellite, in a reverberation chamber. In one of its aspects the system comprises a low frequency high-level broad-band noise source; a tube means including a section formed as an acoustic horn connected at its small end to the low frequency source and at its large end to the chamber. A Hartmann-type air acoustic high level noise generator, or generators are located inside the tube at a predetermined position. In operation the generator is excited by the generated low frequency noise to provide an output of non-linearly modulated noise. Also described is a Hartmann-type noise generator which comprises a nozzle and an aligned acoustic tube spaced therefrom by an air gap. A reverberation cup is formed in the mouth of the tube facing the nozzle and a bridge member extends between the nozzle and tube and spans the air gap. Means is provided for varying the depth of the reverberation cup and for adjusting the size of the gap if desired.

23 Claims, 10 Drawing Figures

METHOD FOR GENERATING HIGH FREQUENCY HIGH LEVEL NOISE FIELDS USING LOW FREQUENCY EXCITATION OF AEROACOUSTIC NOISE

BACKGROUND OF THE INVENTION

The present invention relates to a system for generating high frequency high level noise fields.

High intensity noise fields of specified spectral shapes are required for a number of industrial and technical testing purposes an example of which is the provision of a high level noise field to excite and test aerospace structures in a simulated noise environment of rocket, jet engine and propeller noise. The production of such noise fields in the frequency range above 1.25 KHz has been found to be either impractical or expensive. Certain acoustic test facilities have been using commercially available low or medium frequency noise generators. These generators suffer from high-frequency roll-off above about 500 Hz. A few test facilities have been using aeroacoustic noise sources such as impingement jets, shock cell noise, Hartmann generators or modified Hartmann generators in place of conventional "high" frequency noise generators. The Hartmann generator produces narrow band high level tones and if it is detuned could, less effectively, produce broad band tones. In order to fill up the width of the frequency spectrum with noise, many Hartmann generators would have to be added. However this solution is impractical insofar as the cost of operating multiple Hartmann generators makes the solution uneconomical and further the interaction of the Hartmann signals does not always produce the desired spectrum, as tests have shown.

For a background on the noise testing of articles reference is made to the paper entitled The Use of Hartmann Generators as Sources of High Intensity Sound in a Large Absorption Flow Duct Facility, D. L. Martlew of the National Gas Turbine Establishment at Farnborough, Hants, United Kingdom, (published in the A.I.A.A. March 1975). The paper discusses a large scale noise test facility used in an aeroengine reduction noise program. Another paper of interest is that of D. A. Webster and D. T. Blackstock, Journal of the Acoustic Society of America 63(3), March 1978, pages 687–693 which discusses the interaction of high level high frequency tones with low level broad band noise by collinear propagation.

The problem facing the test facilities is to fill up the produced noise spectrum between 500 Hz and say, 10 KHz in an economical practical fashion.

STATEMENT OF THE INVENTION

According to the present invention there is provided a system for producing noise comprising a tube means, at least one high frequency high-level noise generator adapted for communication with said tube means; a low frequency high-level noise source operatively connected to said tube means and for interaction with said generator whereby, in operation, said generator is excited by the generated low frequency noise to provide an output of non-linearly modulated noise.

According to a preferred feature of the invention a system for producing noise for sonic testing of an article in a reverberation chamber comprises tube means adapted for communication with the inside of the chamber; at least one aeroacoustic high frequency high-level noise generator in the tube means; a low frequency high-level noise source operatively connected to the tube means whereby, in operation, the generator is excited by the generated low frequency noise to provide an output of non-linearly modulated noise. The source may be a broad band or a narrow band low-frequency noise source. Conveniently the tube means may include an acoustic horn adapted for operative connection to the source at its small end and for operative connection to the reverberation chamber at its large end.

In one preferred form of the invention a system for producing noise for sonic testing of an article in a reverberation chamber comprises a low frequency high-level broad band noise source; a tube means including a section formed as an acoustic horn adapted for operative connection at its small end to the source and at its large end to the chamber, and at least one Hartmann-type aeroacoustic high-level noise generator located inside the tube at a predetermined position whereby, in operation, the generator is excited by the generated low frequency noise to provide an output of non-linearly modulated noise. In a modification, two Hartmann-type aeroacoustic high-level noise generators may be located in the tube means at predetermined spaced positions therealong, the generators being tuned to different frequencies.

The invention also provides a Hartmann-type noise generator comprising a tube; a slot cut out of the tube wall to produce an air gap between a nozzle section of the tube at one side of the gap and a reverberation cup formed in the tube on the other; the nozzle section and the cup being united by an uncut portion of the tube wall spanning the slot and an adjustable tuning plug means in the cup.

According to another feature of the invention a Hartmann-type noise generator comprises a nozzle and an aligned acoustic tube spaced therefrom by an air gap; a reverberation cup formed in the mouth of the tube facing the nozzle and bridge means extending between nozzle and tube and spanning the air gap and being in contact with a section of a peripheral wall of the nozzle and an aligned section of a peripheral wall of the tube; and means for varying the depth of the reverberation cup.

DESCRIPTION OF THE DRAWINGS

The following is a description by way of example of certain embodiments of the present invention reference being had to the accompanying drawings in which.

DESCRIPTION OF PREFERRED EMBODIMENTS

Figure 1:
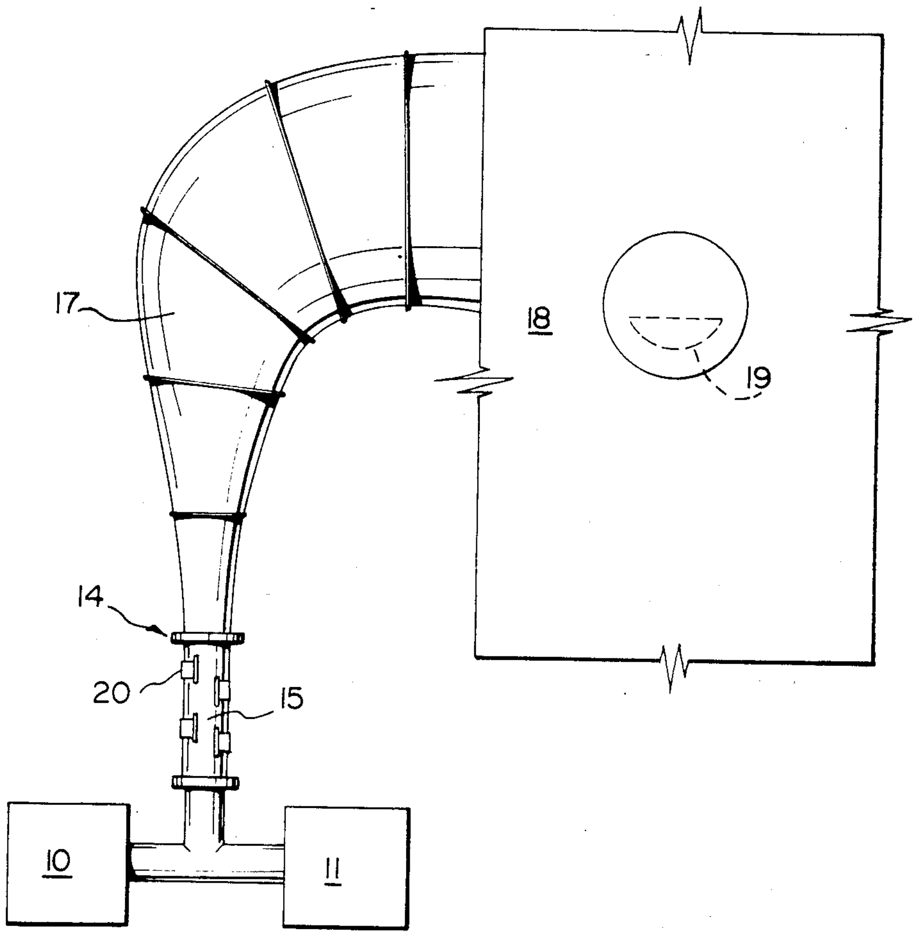
FIG. 1 is a schematic representation of an application of the invention to the testing of an article in a reverberation chamber.
Figure 7:
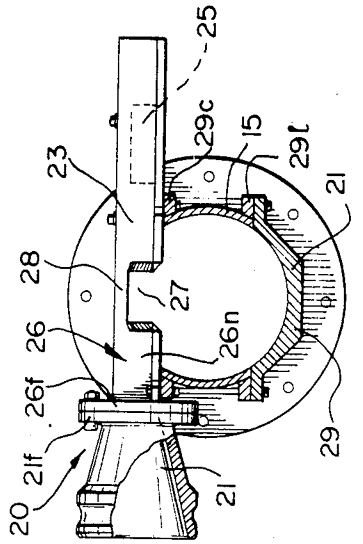
FIG. 7 is a section along the lines 7—7 of FIG. 6 showing an aeroacoustic generator of the Hartmann type.
Figure 8:
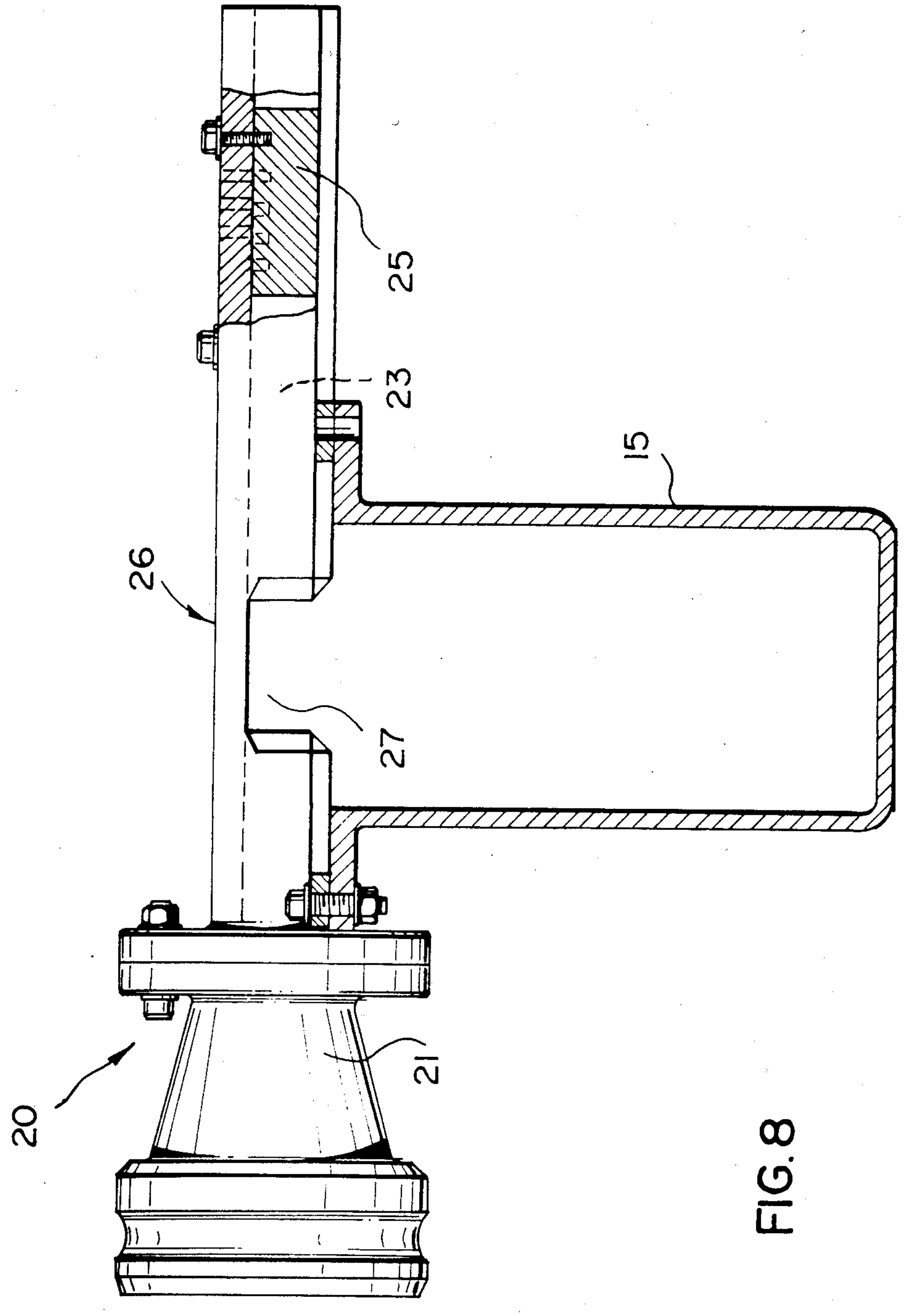
FIG. 8 is a cross-section similar to FIG. 6 and showing a rectangular tube means.

Turning now to the drawings. In FIG. 1 a pair of broad-band (or tonal) low-frequency high level noise sources 10 and 11 are operatively connected through a Tee-piece with a tube means 14 having a tubular section 15 which may be of circular cross-section, or rectangular cross-section as seen in FIGS. 7 and 8 respectively. The noise sources may conveniently be Wyle broad-band devices of the type known as WAS 3000. Equally well, the noise sources could be of the Ling type, such as sold by Ling Altec Limited under the model no. EPT-200, electro-pneumatic transducer. In noise sources of this type, compressed air at up to about 30 PSIG is blown into a chamber where slotted sleeves slide axially under the action of an electrodynamic coil. The soundwaves thus generated are propagated through the Tee-piece and into the tube means 14.

The tube means 14 may include an acoustic horn 17 connected at its broad end to a reverberation chamber 18.

Figure 6:
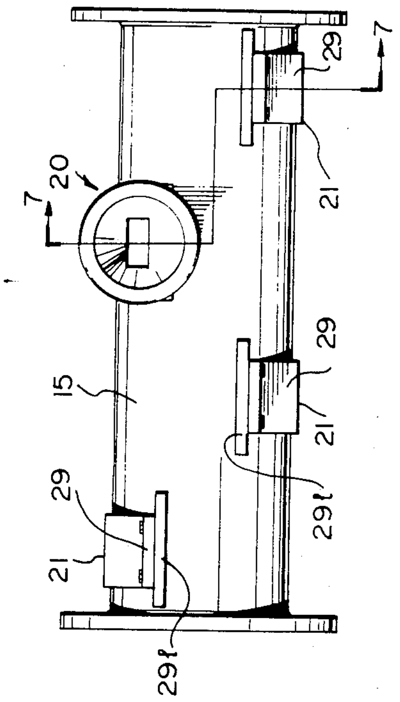
FIG. 6 is a detail of a tube modified to accept a plurality of aeroacoustic noise sources.

Arranged at, say, four separate places along the length of the tubular section 15, are receiving apertures (see also FIGS. 6, 7 and 8) for an aeroacoustic noise generator, or generators, such as Hartmann-type generators 20. Hartmann-type generators are well known in the art and do not require detailed explanation here but generally speaking air is delivered at high speeds through a converging nozzle 21 and impinges directly into the open end of a resonance cup 23. The shock wave created responds to the acoustic pressure waves in the resonance cup 23 and a high intensity sound is emitted. This sound has a spectrum consisting of a fundamental tone 30 (FIG. 2) and harmonics 32, 33. The fundamental tone is related to the depth of the resonance cup which may be tuned by moving a plug 25 (FIGS. 7, 8 and 9) longitudinally within the resonance tube, as will be explained more fully hereinafter.

Figure 2:
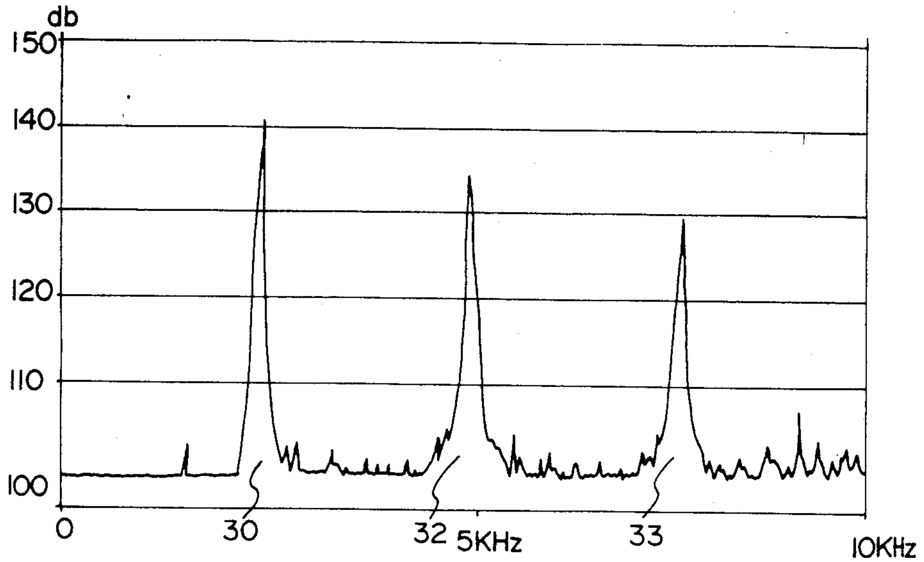
FIG. 2 is the acoustic spectrum propagated into a test chamber from a Hartmann-type generator, operated alone.
Figure 3:
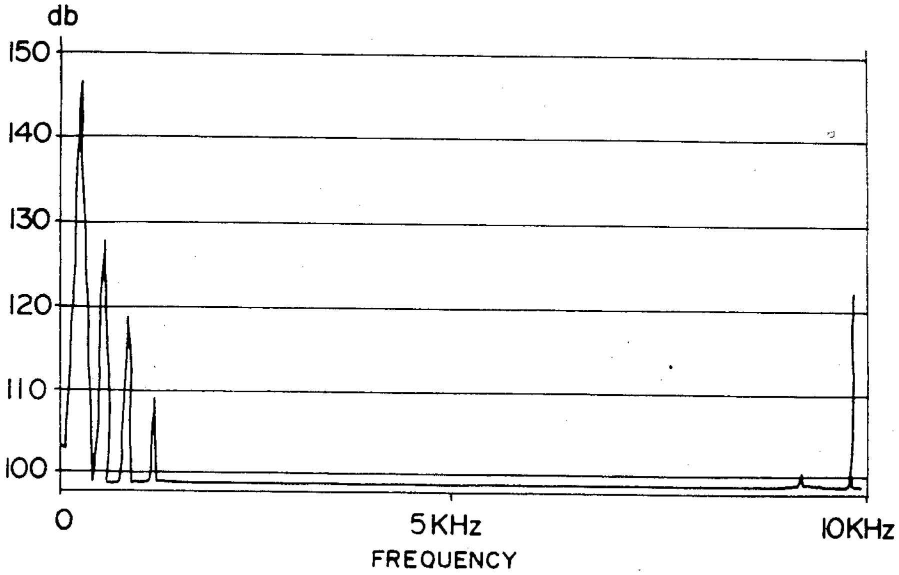
FIG. 3 is the acoustic spectrum propagated into the same chamber from a low frequency high-intensity tonal noise source, operating alone.
Figure 4:
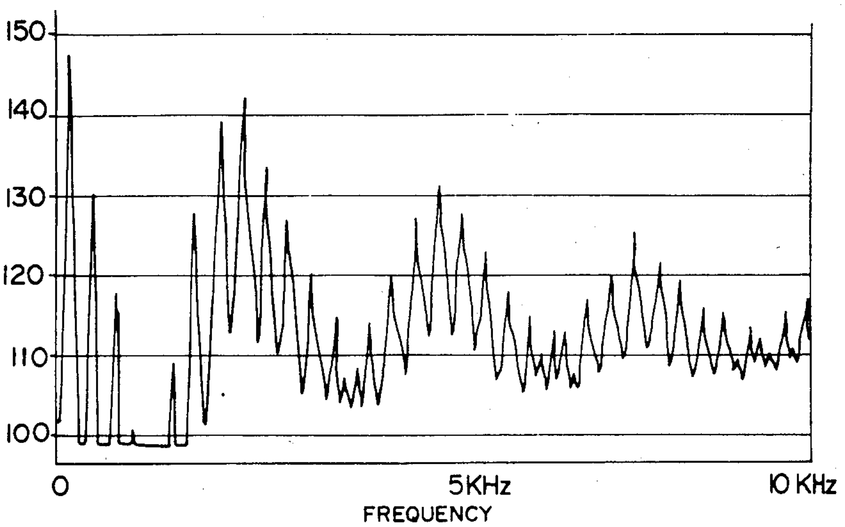
FIG. 4 is the acoustic spectrum propagated into the same test chamber when the functioning of the Hartmann-type generator is modified by a high intensity tone from the low frequency source.

For the sake of simplicity of understanding, consideration should be given to the interaction between a single low frequency source 10, or 11, controlled to emit a tonal sound spectrum somewhat similar to that shown in FIG. 3 with a single Hartmann-type aeroacoustic noise generator 20 producing a sound spectrum similar to that shown in FIG. 2. The noise from the sound source 10 interacts with, and excites, the natural unsteady oscillatory aerodynamic flow in the Hartmann-type generator 20 to produce noise output which is a non-linear modulation (see FIG. 4) of the normal noise generation of the Hartmann generator 20. It will be noted that the Hartmann-type device, or devices 20 are preferably positioned along the tubular section 15 so as to be close to the high noise levels generated by the sources 10, 11. However, it is to be understood that if desired, the tube means 14 could have provision made in its horn section 17 to receive one or more noise generators 20.

The propagated sound proceeds along the horn 17 into a reverberation chamber 18, in which the air is preferably kept dry, and acts upon a test piece 19 suspended in the reverberation chamber 18.

Depending upon the nature of the sound envelope which it is desired to generate, and this of course will be dictated by the nature of the test or function which is to be conducted, one or more Hartmann-type generators 20 may be positioned along the tubular section 15 and one or more Wyle, or the like, sources may be operated. Where it is desired to produce a broad spectrum flat envelope, a Wyle WAS 3000 type device may be combined with two Hartmann-type generators 20 tuned to different frequencies to produce the sound spectrum seen in FIG. 5. Such a sound envelope, because of its high intensity over a wide spectrum, is particularly useful for testing of aerospace equipment, satellites and the like.

Figure 5:
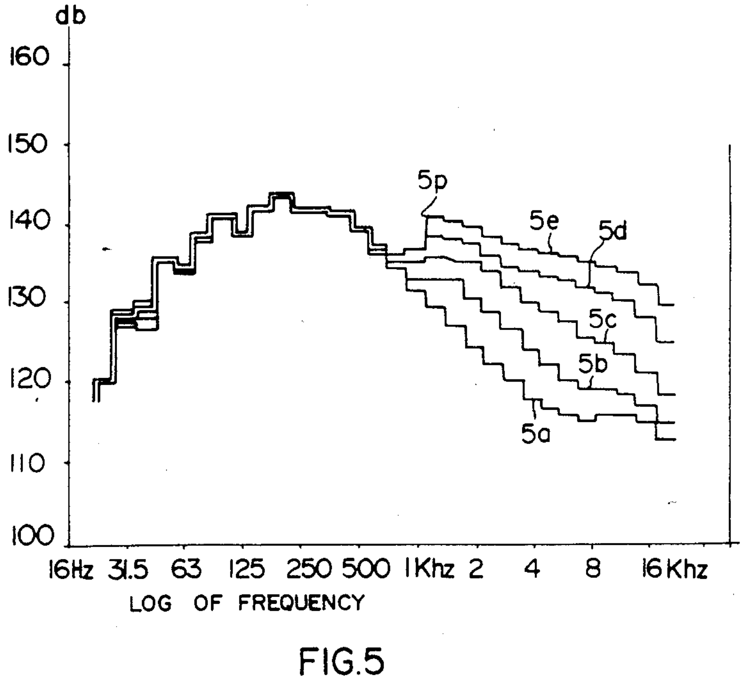
FIG. 5 is the wide broad band spectra propagated in the chamber and using a logarithmic frequency scale, when the functioning of two differently tuned Hartmann-type generators is modified by a low frequency broad band noise source.

The curve 5*a* in FIG. 5, is that of a WAS 3000 alone tuned to provide a broad band, low frequency, high intensity noise and the curves 5*b*–5*e* are of two Hartmann-type generators 20 modulated by the WAS 3000 and operated at different supply pressures. The peak 5*p* may be adjusted to higher or lower frequencies depending on the tunings of the Hartmann generators 20 and can be shifted to the left (as seen in FIG. 5) to merge with the WAS 3000 broadband noise.

Turning now particularly to FIGS. 6 through 9, the novel Hartmann-type generator shown differs from the standard Hartmann-type acoustic generator in that it does not comprise a separate nozzle and resonator cup section. Rather a tube member 26 is provided with a slot 27 which is cut into the tube member wall. In the rectangular cross-section tube 26 shown, the slot is cut into three adjacent side walls leaving a top uncut wall section 28 to span the slot. The tube member 26 is provided with a flange 26*f* which is bolted to a flange 21*f* (FIG. 7) of a converging nozzle section 21 which connects to an air source. On the left of the gap 27 is the nozzle section 26*n* of the tube and on the right hand side of the air gap 27 (as seen in FIG. 7) is the resonator cup 23. The tuning of the generator is accomplished by moving the plug 25 forwards or backwards in the cup 23 longitudinally of the tube 26. The movement of the plug 25 can be accomplished in any desired fashion.

Figure 9:
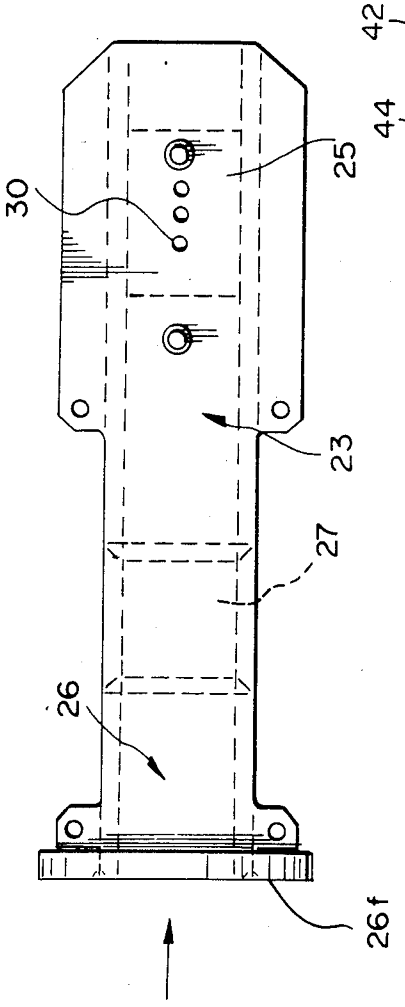
FIG. 9 is a detail of a tuning arrangement for the aeroacoustic noise generator of FIG. 7.

In FIG. 9 there is shown a simple form or adjustment in which a series of holes 30 are drilled in line in the top wall of the tube member 26 and a series of co-operating tapped holes are provided in the plug. The plug is moved backwards and forwards in the tube 26 and positioned by inserting a cap screw or screws into the appropriate holes in the tube 26 and into the corresponding threaded holes in the plug 25 to anchor it. Obviously a more elaborate or even automatic system could be provided in which electrically driven devices, or hydraulic or pneumatic cylinders, or the like, could be provided to push or pull the plug, within the tube 26, to position it. Thus the plug position, and consequently the tuning of the generator, could be remotely controlled. In tubes with short resonant cavities, the tube cross-sectional area and shape may often prove to be an important factor in tuning the generator to the desired frequency. Thus, rectangular, square, triangular, semi-circular, or other suitable cross-sectional shape may be selected to produce the desired frequency for a given air flow.

In the inventive configuration shown, at least two advantages accrue. First the wall 28 serves to combine the cavity 23 and nozzle 26*n* in accurate alignment and as a unitary structure. Second, the aerodynamic and acoustic frequency performances are virtually that of a tube of twice the cross-sectional area, additionally the aerodynamic boundary layer on the wall 28 may allow operation of the generator to be extended from supercritical nozzle pressure ratio down to subcritical nozzle pressure ratios, thereby providing a greater range of selectable spectrum shapes and noise levels.

In order to attach the Hartmann-type generator in position on the tube section 15, one of the blanking yokes 29 (see FIG. 6) is simply unbolted from its ledge 29*l* and the tube 26 of the generator 20 is bolted on that ledge 29*l*.

Figure 10:
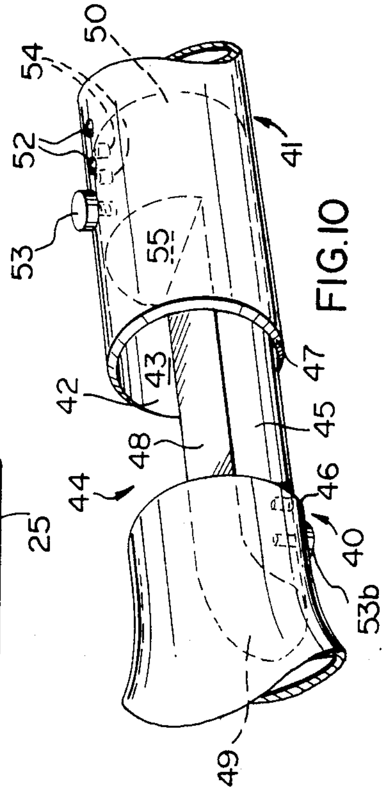
FIG. 10 is a detail of a second form of aeroacoustic noise generator.

FIG. 10 shows a second form of modified Hartmann-type generator in which a circular section nozzle 40 is aligned with an acoustic tube 41 in the mouth of which 42 is formed a reverberation cup 43. An air gap 44 separates the nozzle 40 from the tube 41, in normal fashion. The gap 44 may be varied to accommodate different noise generation conditions and suitable clamping means may be provided to connect nozzle 40 and tube 41 for relative movement and to permit them to be clamped in a variety of spacings.

A bridge member 45 spans the air gap 44 and is slidingly engaged within the nozzle 40 and the tube 41, resting on aligned sections of the peripheral walls 46, 47 of nozzle and tube respectively. The bridge section is of semi-circular cross-section where it spans the air gap and has a flat 48 machined on its top side. At the nozzle end of the bridge member, the flat 48 is curved away at 49 towards the nozzle to provide for smooth passage of air from the nozzle. At the other end of the bridge member 45 is a plug 50 formed integrally with the bridge member 45 and being of circular section to fit snugly within tube 41. A series of holes 52 in the upper section of the peripheral wall 47 accommodates a threaded screw member 53 which can be engaged in a selected one of a series of threaded holes 54 in the circular plug 50 when the bridge member is moved backwards and forwards within the tube 41 and nozzle 40 to vary the depth of the reverberation cup 43, between the mouth of the tube 41 and the flat face 55 formed on the plug at the point where it meets with the flat 48 on the bridge member. It will be understood that any other suitable mechanism may be provided for sliding and fixing the plug 50 in the tube 41.

As has been indicated, if desired suitable means may be provided to clamp the bridge 45 to the nozzle 40, for example a series of holes similar to 52 may be provided in the lower section of peripheral wall 46 of nozzle 40, to accommodate a threaded screw member 53*b* which can engage in one of a series of threaded holes, similar to holes 54, provided in the underside of bridge 45 where it enters nozzle 40.

By sliding the bridge 45 with its plug 50 within the tube 41 so as to vary the depth of the reverberation cup 43, the Hartmann-type generator may be tuned to different frequencies.

This novel version of generator has the advantages of that described above with reference to FIGS. 7, 8 and 9 and additionally provides for a variable air gap. Where a variable air gap is not desired, the bottom segment of the peripheral walls 46, 47 may be left integral, that is to say as with the generator shown in FIGS. 7, 8 and 9, the gap 44 may be cut as a slot and a wall, like 28, left in place.

Although the invention has been described with reference to the operation of the generated noise being used to sonic test a piece of space equipment, it will be understood that noise generated in the tube and passed either directly from the tube section, or through the acoustic horn, or some other suitable tubular arrangement, may be used to shake dust particles from an environment, or to generate sonic waves in a fluid, or the like, in order to accomplish a desired purpose.

What we claim as our invention is:

1. A system for producing noise in a chamber comprising a tube means adapted for communicating with the inside of a chamber; at least one aeroacoustic high frequency high-level noise generator adapted for communication with said tube means; a low frequency high-level noise source operatively connected to said tube means and for interaction with said generator whereby, in operation, said at least one generator is excited by the generated low frequency noise to provide an output of non-linearly modulated noise.

2. A system for producing noise for sonic testing of an article in a reverberation chamber comprising tube means adapted for communication with the inside of said chamber; at least one aeroacoustic high frequency high-level noise generator in said tube means; a low frequency high-level noise source operatively connected to said tube means whereby, in operation, said at least one generator is excited by the generated low frequency noise to provide an output of non-linearly modulated noise.

3. A system as claimed in claim 2 in which said source is a broad band low-frequency noise source.

4. A system as claimed in claim 2 in which said source is a narrow band low-frequency noise source.

5. A system as claimed in claim 2 in which said tube means includes an acoustic horn adapted for operative connection to said source at its small end and for operative connection to said reverberation chamber at its large end.

6. A system as claimed in claim 3 in which said tube means includes an acoustic horn adapted for operative connection to said source at its small end and for operative connection to said reverberation chamber at its large end.

7. A system as claimed in claim 4 in which said tube means includes an acoustic horn adapted for operative connection to said source at its small end and for operative connection to said reverberation chamber at its large end.

8. A system for producing noise for sonic testing of an article in a reverberation chamber comprising a low frequency high-level broad band noise source; a tube means including a section formed as an acoustic horn adapted for operative connection at its small end to said source and at its large end to said chamber, and at least one Hartmann-type aeroacoustic high-level noise generator located inside said tube means at a predetermined position whereby, in operation, said at least one generator is excited by the generated low frequency noise to provide an output of non-linearly modulated noise.

9. A system as claimed in claim 8 in which two Hartmann-type aeroacoustic high-level noise generators are located the tube means at predetermined spaced positions therealong, said generators being tuned to different frequencies.

10. A system as claimed in claim 3 in which said at least one generator is a Hartmann-type noise generator.

11. A system as claimed in claim 10 in which two Hartmann-type noise generators tuned to different frequencies are located in said tube means at predetermined positions.

12. A system as claimed in claim 4 in which said at least one generator is a Hartmann-type noise generator.

13. A system as claimed in claim 12 in which two Hartmann-type noise generators tuned to different frequencies are located in said tube means at predetermined positions.

14. A system as claimed in claim 1 in which said source is at least one electro-pneumatic transducer.

15. A system as claimed in claim 2 in which said source is at least one electro-pneumatic transducer.

16. A Hartmann-type noise generator comprising a tube; a slot cut out of said tube wall to provide an air gap between a nozzle section of the tube at one side of said gap and a reverberation cup formed in the tube on the other; said nozzle section and said cup being united by an uncut portion of the tube wall spanning said slot; and an adjustable tuning plug in said cup.

17. A noise generator as claimed in claim 16 in which said tube is rectangular in cross-section and in which said slot is cut in three adjacent wall sides of said rectangle.

18. The generators as claimed in claim 16 in which means is provided for positioning the tuning plug longitudinally within the cup.

19. The generators as claimed in claim 17 in which means is provided for positioning the tuning plug longitudinally within the cup.

20. The Hartmann-type noise generator comprising a nozzle and an aligned acoustic tube spaced therefrom by an air gap; a reverberation cup formed in the mouth of said tube facing said nozzle and bridge means extending between nozzle and tube and spanning said air gap and being in contact with a section of a peripheral wall of said nozzle and an aligned section of a peripheral wall of said tube; and means for varying the depth of said reverberation cup.

21. A generator as claimed in claim 20 in which said nozzle and said tube are of circular section and said bridge means is a member of semi-circular section where it spans said air gap, said bridge member extending into said nozzle and into said acoustic tube.

22. Apparatus as claimed in claim 21 in which said means for varying the depth of said reverberation cup is a circular plug formed integrally with the end of said bridge member and located within said reverberation cup, and position adjusting means to positively locate said plug within said acoustic tube.

23. Apparatus as claimed in claim 20 in which means is provided for securing said bridge means to said nozzle and to said tube to permit relative movement between said nozzle and tube to vary said air gap.

* * * * *